United States Patent Office 3,834,867
Patented Sept. 10, 1974

3,834,867
PROCESS FOR INCREASING THE AFFINITY FOR ANIONIC DYES OF HIGH MOLECULAR WEIGHT ORGANIC COMPOUNDS CONTAINING ALKYL-ATABLE GROUPS
Max Matter, Basel, Giuseppe Raspanti, Neu-Allschwil, Basel-Land, and Hermann Ulshoefer, Therwil, Basel-Land, Switzerland, assignors to Sandoz Ltd., Basel, Switzerland
No Drawing. Filed Mar. 10, 1972, Ser. No. 233,708
Claims priority, application Switzerland, Mar. 15, 1971, 3,752/71
Int. Cl. D06m 13/46
U.S. Cl. 8—115.5
16 Claims

ABSTRACT OF THE DISCLOSURE

Process for increasing the affinity for anionic dyes of undyed water-insoluble high molecular weight organic compounds containing groups which can be alkylated, which process comprises reacting the high molecular weight compound with an ammonium salt of the formula:

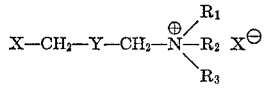

in which X signifies chlorine or bromine,

Y signifies a radical of formula —CH=CH— or a phenylene radical which is unsubstituted or substituted by up to a total of 2 alkyl groups which may be methyl or ethyl, $R_1$, $R_2$ and $R_3$, independently signify hydrocarbon radicals consisting of aromatic and/or saturated aliphatic units, or two of $R_1$, $R_2$ and $R_3$ jointly with the N atom form a heterocyclic ring, which is selected from heterocyclic rings containing one nitrogen atom, two nitrogen atoms and one nitrogen atom and one oxygen atom, and the other signifies a hydrocarbon radical as defined above or a further bond when the ring is unsaturated, the total number of carbon atoms in $R_1$, $R_2$ and $R_3$ not being greater than 20, and the N atom not being bound directly to more than one aromatic radical.

---

This invention relates to a process for increasing the affinity for anionic dyes of undyed water-insoluble organic compounds of high molecular weight containing groups which can be alkylated.

The invention provides a process for increasing the affinity for anionic dyes of undyed water-insoluble high molecular weight organic compounds containing groups which can be alkylated, which process comprises reacting the high molecular weight compound with an ammonium salt of formula I,

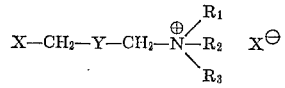

in which X signifies chlorine or bromine.

Y signifies a radical of fromula —CH=CH— or a phenylene radical which is unsubstituted or substituted by up to a total of 2 alkyl groups which may be methyl or ethyl, $R_1$, $R_2$ and $R_3$, independently signify hydrocarbon radicals consisting of aromatic and/or saturated aliphatic units, or two of $R_1$, $R_2$ and $R_3$ jointly with the N atom form a heterocyclic ring, which is selected from heterocyclic rings containing one nitrogen atom, two nitrogen atoms and one nitrogen atom and one oxygen atom, and the other signifies a hydrocarbon radical as defined above or a further bond when the ring is unsaturated, the total number of carbon atoms in $R_1$, $R_2$ and $R_3$ not being greater than 20, and the N atom not being bound directly to more than one aromatic radical,.

Each of the radicals $R_1$, $R_2$ and $R_3$ may be, for example, straight chain alkyl radicals or secondary alkyl radicals such as isopropyl, 2-butyl, 3,methyl - 2 - butyl, 2-pentyl, 2,2-dimethyl-3-butyl, 2-hexyl, 3-hexyl, 2-methyl-3-pentyl, 3-methyl-2-pentyl, 4-methyl - 2 - pentyl, 2,2-dimethyl-3-pentyl, 2,4 - dimethyl - 3 - pentyl, 2-heptyl, 3-heptyl, 4-heptyl, 2 - methyl - 3 - hexyl, 4-methyl-3-hexyl, 5-methyl-3-hexyl, 3-ethyl - 4 - hexyl, 2,2-dimethyl - 3 - hexyl, 2,4-dimethyl - 3 - hexyl, 2,5-dimethyl-3-hexyl, 3,4-dimethyl-2-hexyl, 2-methyl - 3 - heptyl, 3-methyl-2-heptyl, 3-methyl-4-heptyl, 4-methyl - 3 - heptyl, 5-methyl-3-heptyl, 6-methyl-2-heptyl, 2-octyl, 3-octyl, 4-octyl, 2,3,4-trimethyl-3-pentyl, 5-ethyl-2-heptyl, 2,2-dimethyl - 3 - heptyl, 2,6-dimethyl-4-heptyl, 2-methyl-3-octyl, 3-methyl-4-octyl, 6-ethyl-3-octyl, 2-decyl, 5-decyl, 2,2-dimethyl - 3 - octyl, 2-methyl-4-nonyl, 3-methyl - 3 - nonyl, 6-ethyl-3-decyl, 7-ethyl-2-methyl-4-nonyl, 2-dodecyl, 2,6,8-trimethyl - 4 - nonyl, 2-tridecyl, 2-tetradecyl, 2-pentadecyl, 2-hexadecyl, cyclopentyl, cyclohexyl, cycloheptyl, 2-, 3- and 4-methylcyclohexyl, cyclooctyl, 2,5- 2,6- 3,4- and 3,5-trimethyl cyclohexyl, 1-cyclohexyl propyl, 2-propyl cyclohexyl, 3,3,5-trimethyl cyclohexyl, 2-butylcyclohexyl, 4-tert. butyl-cyclohexyl, 3-methyl-6-isopropyl cyclohexyl and cyclododecyl. The radicals $R_1$, $R_2$ and $R_3$ may be bound through a primary carbon atom to the N atom but otherwise be branched. Examples of such alkyl radicals are 2-methyl-1-propyl, 2,2-dimethyl-1-propyl, 2-methyl - 1 - butyl, 2-ethyl - 1 - butyl, 2,2-dimethyl - 1 - butyl, 2-methyl - 1 - pentyl, 3-methyl-1-pentyl, 4-methyl - 1 - pentyl, 2,4-dimethyl - 1 - pentyl, 2-ethyl-1-hexyl, 2,2-dimethyl - 1 - hexyl, 2,2,4-trimethyl - 1 - pentyl, 4-methyl - 2 - propyl - 1 - pentyl, 3,7-dimethyl-1-octyl, 2,2-dimethyl - 1 - decyl, cyclohexyl-methyl, 2-cyclohexyl-ethyl, cycloheptyl-methyl, 3-cyclohexyl-propyl, cyclooctyl-methyl, cyclo-undecyl-methyl and cyclododecyl - methyl. Other suitable significances of $R_1$, $R_2$ and $R_3$ are aromatic radicals which may be unsubstituted or substituted by alkyl radicals; numerous examples of such primary and secondary, straight or branched alkyl radicals are named above. The aromatic radicals may be substituted by tertiary alkyl radicals, e.g. tert.butyl, 2-methyl-2-butyl, 2,3-dimethyl-2-butyl, 2-methyl - 2 - pentyl, 3-methyl - 3 - pentyl, 3-ethyl - 3 - pentyl, 2,4 - dimethyl - 2 - pentyl, 2-methyl-2-hexyl, 3-methyl - 3 - hexyl, 3,4-dimethyl - 3 - hexyl, 3,5-dimethyl - 3 - hexyl, 2-methyl - 2 - heptyl, 3-methyl-3-heptyl, 4-methyl - 4 - heptyl, 2,3,4-trimethyl-3-pentyl, 2,4,4-trimethyl - 2 - pentyl, 3-ethyl - 3 - heptyl, 2-methyl-2-octyl, 4-methyl - 4 -octyl, 3,6-dimethyl-3-octyl, 3,7-dimethyl - 3 - octyl, 2,4,4,6,6 - pentamethyl - 2 - heptyl, 1-methyl-cyclopentyl, 1-methylcyclohexyl, 1-methyl-cycloheptyl, 1-propyl-cyclopentyl, 1-butyl-cyclopentyl, 1-butyl-cyclohexyl and 1-pentyl-cyclopentyl. The radicals $R_1$, $R_2$ and $R_3$ may also signify aromatic or alkylaromatic radicals, the preferred aromatic radicals being phenyl and naphthyl. Examples of hydrocarbon radicals consisting of aromatic and saturated aliphatic units are 2-, 3- and 4 - methylphenyl, 2,3-, 2,4-, 2,5-, 3,4- and 3,5-dimethylphenyl, 2-, 3- and 4-ethylphenyl, 2,3,5- and 2,4,5-trimethylphenyl, 3-ethyl-5-methylphenyl, 4-sec. butylphenyl, 2- and 4-tert. butyl-phenyl, 5 - isopropyl-methyl-phenyl, 4-tert. pentyl-phenyl, 2-tert. butyl - 4 - methyl-phenyl, 4-tert. butyl-2-methyl-phenyl, 6-tert.butyl - 3 - methyl-phenyl, 2,4-ditert. butyl-phenyl, 4-(1',1',3',3' - tetramethylbutyl)-phenyl, 2 - methyl - 4 - (1',1',3',3' - tetramethylbutyl)-phenyl, 4-nonyl-phenyl (mixtures of isomers), benzyl, 1- and 2-phenyl-ethyl, 1-phenyl - 1 - propyl, 1-phenyl - 2 - propyl, 2-phenyl - 1 - propyl, 3-phenyl - 1 - propyl, 1-(o-tolyl)- ethyl, 1-(m-tolyl)-ethyl, 1-(p-tolyl)-ethyl, 1 - phenyl-1-butyl, 2 - (2',4',6' - trimethylphenyl)-ethyl, 1-phenyl-1-pentyl, 1-(4'-tert.butylphenyl)-ethyl, 4-methyl-1-phenyl-2-pentyl and benzohydryl.

When two or three of $R_1$, $R_2$ and $R_3$ together with the N atom represent a heterocyclic ring this ring may be pyrrolidine, piperidine, morpholine, pyridine or quinoline.

The simplest representative of the compounds of general formula I is known. It is formed by reaction of trimethylamine with 1,4-dichloro-2-butene in dioxane as described in the Journal of the American Chemical Society 72, 5135 (1950):

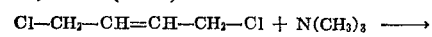

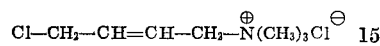

It has been found that homologues are obtainable in an analogous manner by reacting other tertiary amines in place of trimethylamine with 1,4-dichloro-2-butene. The reaction conditions have to be chosen so that only one of the two halogen atoms in the 1,4-dichloro-2-butene reacts. This can be accomplished by working with a solvent which dissolves the starting materials but not the desired final product. The reaction product then settles out of the medium, so the second reactive halogen atom it contains is prevented from reacting with the starting trialkylamine. The desired unilateral introduction of a quaternary ammonium group into the 1,4-dichloro-2-butene is promoted by working with an excess of this compound. Nonpolar solvents such as benzene, cyclohexane, dichloromethane and dioxan normally have low dissolving power for the desired final products of formula I. Solvents of this type slow down the rate of the quaternation reaction, so the reaction temperature has to be increased. In order to obtain other members of the group of compounds of formula I, tertiary amines are reacted in an analogous manner with 1,4 - dibromo-2-butene, bis-(halogenomethyl)-benzenes or bis-(halogenomethyl)xylenes. 1,4 - Dichloro-2-butene and 1,4-dibromo-2-butene in the cis and trans forms are suitable starting materials, as well as mixtures containing the cis and trans forms. The commercially available technical mixtures are highly suitable, for example mixtures of the components:

|  | Percent |
| --- | --- |
| Trans-1,4-dichloro-2-butene | 95–98 |
| Cis-1,4-dichloro-2-butene | 2–5 |
| 3,4-dichloro-1-butene | 0.2–0.5 |

The compounds of formula I have the following distinctive features: (1) the radical X is bound through a methylene radical to a carbon–carbon double bond, therefore this acid radical is easily split off which makes the compounds highly reactive alkylating agents; (2) a quaternary ammonium group is present which is separated by at least 4 carbon atoms from the radical with alkylating action.

A high molecular weight organic compound containing groups capable of alkylation which is particularly suitable for the present process is nylon 66, which along with a great number of carboxylic amide groups bears terminal amino groups. The latter are readily alkylated by compounds of formula I. Following such an alkylating reaction, the amino end group in nylon 66 is linked by a covalent bond through at least 4 carbon atoms to a quaternary ammonium group. This increases the cationic properties of nylon 66 since the original basic centres are still present and additional quaternary ammonium groups are available. Nylon 66 so modified is able to absorb a far greater amount of anionic dye than otherwise and is therefore dyeable more rapidly and to much greater depth. If nylon 66 is modified in an analogous manner by reaction with known compounds in which the group with alkylating action is distant from the basic centre by less than 4 carbon atoms, its dyeability is similarly increased. In such cases the effect obtained is satisfactory in dyeing with substantive cotton dyes, but with acid wool dyes it is inadequate for practical purposes. Constrastingly, nylon 66 modified with a compound of formula I is dyeable to very heavy depths with acid wool dyes. This difference is surprising and is technically valuable because the lower molecular-weight acid wool dyes give leveller and more brilliant dyeings than substantive dyes.

Applied from a neutral or weakly acid medium, the compounds are bound to wool by a covalent chemical linkage. Wool thus modified is dyeable in very heavy shades by acid wool dyes, in contrast to the unmodified fibre.

For the present process, especially when it is employed for increasing the dyeability of nylon 66, compounds of formula I are preferred, which contain no benzene ring bound directly to the N atom and in which the carbon atoms in the radicals $R_1$, $R_2$ and $R_3$ total 5 to 20 or more especially 6 to 12. If one of the radicals $R_1$, $R_2$ or $R_3$ in formula I stands for an alkyl radical in particular an unbranched alkyl radical having 10 to 18 carbon atoms, the compounds are surface-active and toxic to microorganisms, so they can be employed as microbiocides. Other preferred compounds of formula I are those in which one or more especially two of $R_1$, $R_2$ and $R_3$ signifies methyl, as these members of the group are more easily prepared as described above.

In addition to nylon 66, a considerable number of other high molecular weight organic compounds containing groups capable of alkylation are suitable for modification by the disclosed process for example basic modified polypropylene and polyacrylonitrile, many polyamides including nylon 5, 7, 11, 226, 610 and 6.66, and regenerated fibres from natural products, for example cellulose and casein. Of the natural materials, cotton, silk and in particular wool are suitable for treatment. The high molecular weight organic compounds for modification may be present in the form of fibres, continuous filament, woven or knitted fabrics, as films or as thin tapes.

In the process of the invention a water-insoluble, high molecular weight organic compound is reacted with a water-soluble, salt-like alkylating agent of formula I. Owing to the wide difference in the solubility of the reactants, the reaction normally has to be carried out in a heterogeneous system. Preferably a solvent is chosen as reaction medium for the alkylating agent of formula I. Suitable solvents are methanol, ethanol, isopropanol, ethylene glycol, propylene glycol, tertiary butanol and dimethyl formamide. The preferred solvent is water. In certain cases, for instance in the treatment of wool, the reaction can be carried out without the addition of auxiliary agents. But generally it is advantageous to use an agent for binding the acid, e.g. sodium hydroxide, potassium carbonate, sodium hydrogen carbonate, or another non-alkylatable agent, so that the reaction proceeds at a sufficiently rapid rate. Depending on the reactivity of the high molecular weight compound for alkylation, the reaction is suitably carried out at room temperature or at higher temperatures to about 220° C. The alkylating agent can alternatively be applied to the high molecular weight compound under mild conditions and subsequently, after application of the acid-binding agent, the alkylation reaction carried out at low or high temperature as necessary. All these methods are in principle known and correspond to the methods used to apply reactive dyes to water-soluble high molecular weight compounds with formation of a covalent linkage. Besides the parallelism in technique of application between reactive dyes and alkylating agents of formula I, there is a parallelism in the structure of the two classes of products in that the members of each contain a reactive group. The function of this group is to form the covalent linkage with the water-insoluble macromolecular compound. For good reactivity the latter should have high surface area per weight unit. Fibres, filaments, yarns, woven fabrics, knitwear and textiles in other forms are therefore particularly well suited for modification by the present process.

The compounds of formula I are applicable to textiles by exhaust, padding and printing techniques. Methods whereby the compounds are locally applied to react with the textile substrate on defined areas of its surface are especially suitable. They include the screen and roller printing of woven and knitted piece goods and carpets and the vigoureux printing of wool tops and synthetic polyamide tow. Yarns can be locally dyed by the space dyeing technique in the form of bundles, by the "Knit-Deknit" process or in package form by the "Astro Dye" process. Related methods for the space dyeing of simulated furs are available, for example the "Bi-Pol" process. Additionally, solutions of compounds of formula I can be locally deposited on textile substrates by dropping (the "Tak" process) or other techniques.

In other respects the same operating principles apply for the application of compounds of formula I as for reactive dyes: aqueous solutions are used which preferably contain salts and acid-binding agents, along with thickening agents for padding, printing and related methods of application. It is important that these additions should contain no groups which are likely to react with the reactive groups of the compound of formula I under the conditions of treatment. For this reason sodium alginate or polyacrylamide is very suitable as a thickening agent and can be used in conjunction with dispersing agents as required.

After formation of the chemical linkage between the compound of formula I and the textile substrate, washing off or thorough rinsing is advisable to clear the substrate of any residue of the compound that may be present. As the compounds of formula I are colourless before and after reaction with the substrate, there is no visible difference between untreated and treated textiles. But the effect of the treatment is very much in evidence in dyeing with anionic dyes, which dye the treated material or the treated areas of the material much more rapidly and to greater depth as compared with the same untreated material. Textiles which have been locally treated with the disclosed compounds may be compared with the latent image in photography. When dyed by a normal exhaust method a coloured pattern is produced whose outlines conform to the open spaces of the printing screen or the area of the mechanical component used for local application of the compound. Theoretically the same effect could be obtained by printing fabric directly with an equivalent amount of dye, but often this is not practicable as many anionic dyes do not give shades of the desired depth on unmodified substrates. Apart from this technical advantage, it is a great asset in textile production, for example in carpet manufacture, to be able to produce a latent pattern on substantial stocks of undyed material; smaller batches of the treated material can then be dyed with widely different anionic dyes to meet incoming orders. The patterning of separately dyed batches is the same but the colours vary with the choice of dyes.

The process described in the foregoing is capable of wide variation by combination with other techniques. For instance, yarn treated according to this invention can be twisted, woven or tufted (needle-punched) with untreated or differently treated yarn. Another possible variation is to print defined areas of a textile substrate with a compound of formula I and other areas with a compound which reduces or suppresses the affinity for anionic dyes. On dyeing with anionic dyes, the treated textile exhibits patterned effects of heavy shade and of pale shade next to undyed areas.

As stated above, after reaction with ammonium salts of formula I, high molecular weight organic compounds are readily dyeable to heavy depths with acid and direct dyes (cf. Colour Index, 1956, pp. 1001–1404 and 2001–2359). Anionic dyes of other classes, e.g. solubilized vat dyes, can be used, provided that they contain the number of water-solubilizing groups necessary for water solubility. Examples of water solubilizing groups are sulphonic acid and carboxylic acid groups and sulphonamide groups which may be mono-substituted, preferably by lower hydrocarbon radicals, e.g. methyl, ethyl, β-hydroxyethyl, β- or α-hydroxypropyl radicals, or by acyl radicals, e.g. acetyl, propionyl, butyryl, benzoyl, methylsulphonyl, ethylsulphonyl, phenylsulphonyl or 4-methylsulphonyl radicals. Other suitable dyes are the anionic 2:1 metal complex type formed by the reaction of metallizable dyes with agents donating chromium or cobalt. The selected dyes must bear at least one water-solubilizing group to be sufficiently soluble for practical use. Vat, sulphur and naphthol dyes are not suitable.

The invention also provides novel compounds of formula

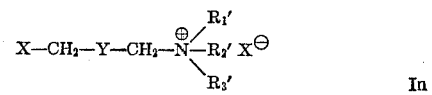

In in which X and Y are as defined above, and $R'_1$, $R'_2$ and $R'_3$ are the same as $R_1$, $R_2$ and $R_3$ as defined above, but with the added proviso that
(i) when Y signifies —CH=CH— or a 1,4-phenyl radical and two of $R'_1$, $R'_2$ and $R'_3$ signify methyl, the other does not signify phenyl, or
(ii) when Y signifies —CH=CH—, then $R'_1$, $R'_2$ and $R'_3$ do not all signify methyl.

Particularly preferred compound are those of formula In, wherein Y signifies —CH=CH—, X signifies chlorine and two of $R'_1$, $R'_2$ and $R'_3$ signify methyl and the other signifies benzyl or cyclohexyl.

The invention also provides a process for the production of compounds of formula In, which comprises reacting a compound of formula $$X-CH_2-Y-CH_2-X$$

in which X and Y are as described above, with a compound of formula $R'_1-N(R'_2)-R'_3$ in which $R'_1$, $R'_2$ and $R'_3$ are as defined above.

The process is carried out as described above.

In the following examples the parts and percentages are by weight and the temperatures in degrees centigrade. The Colour Index (C.I.) references are to the second edition published in 1956.

EXAMPLES OF THE PRODUCTION OR COMPOUNDS OF FORMULA I

Example A

At room temperature, 135 g. (1 mol) of N-benzyl dimethylamine are added with stirring to 687 g. (5.5 mols) of 1,4-dichloro-2-butene. A white precipitate settles out immediately. As the reaction is exothermic the temperature of the mixture increases rapidly, so external cooling is applied to keep it below 60°. On completion of the reaction stirring is continued for 20 minutes at 60°. After cooling to about 20° the white precipitate is filtered with suction, washed several times with acetone and dried with vacuum. The product is 242 g. of an ammonium salt of formula IV,

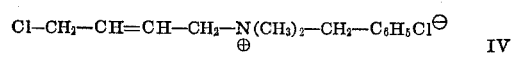

IV

The values for C, H, Cl and N found in elementary analysis agree with the above formula IV. The found value for ionic chlorine is one half of the total chlorine content.

In the production of the above ammonium salt on a bulk scale it is advisable to control the rate of the exothermic reaction by the slow addition of N-benzyl dimethylamine and to maintain the temperature constant at 30–45° by external cooling.

Example B 21.0 g. (0.12 mols) of 1,3-(bis-chloromethyl)-benzene are dissolved in 200 ml. of acetone, the solution is cooled to 1° and 6.5 g. (0.11 mols) of trimethyl amine cooled to —70° are added with stirring. A white precipitate immediately settles out. In 1 hour the temperature is allowed to increase to 20°, then stirring is continued at 40° until the mixture no longer reacts alkaline. On cooling the precipitate is filtered with suction, washed with acetone and vacuum dried. The ammonium salt for formula V,

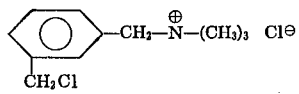         V is obtained in a yield of 24.6 g.

The values for the content of C, H, Cl and N found in elementary analysis agree with those shown in the above formula V. The found value for ionic chlorine is one half of the total chlorine content.

Further examples C to M of compounds useful in this invention are set out in Table 1 below. They are produced in analogy with the procedures of Examples A and B and the values for their content of the aforestated elements found in analysis agree with the calculated values. Next to the constitution the tables lists the solvent used as reaction medium, the reaction temperature (the reaction was commenced at the lower and completed at the higher temperature) and the reaction time.

cm. between the stripes. The fabric is steamed for 10 minutes at 100–102° with saturated steam, rinsed and dried. Using all the compounds described in Examples A to M, at concentrations of 5 and 30 parts per 1000 parts of paste, 24 invisible (latent) stripes are produced.

Cuttings of the fabric containing all the 24 parts are dyed with the following anionic dyes:

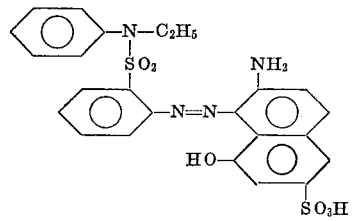  (a)

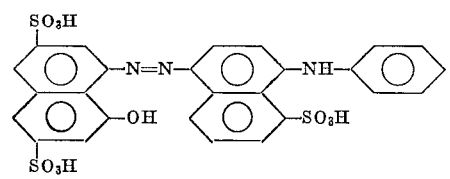  (b)

TABLE 1

Examples of compounds of Formula $X-CH_2-Y-CH_2-Q^\oplus \ X^\ominus$  VI

| No. | X | Y | Q | Solvent | Reaction conditions at— | |
|---|---|---|---|---|---|---|
| | | | | | Temperature, °C. | Time in hrs. |
| C | Cl | —CH=CH— | N(CH₃)₃ | Carbon tetrachloride | 0–40 | 2 |
| D | Cl | —CH=CH— | N(C₂H₅)₃ | do | 20–80 | 5 |
| E | Cl | —CH=CH— | H⟨⟩—N(CH₃)₂ | do | 20–40 | 5 |
| F | Cl | —CH=CH— | H₂₅C₁₂—N(CH₃)₂ | 1,4-dichloro-2-butene | 70–80 | 1 |
| G | Cl | —CH=CH— | ⟨⟩—N(CH₃)₂ | do | 40–45 | 18 |
| H | Cl | —CH=CH— | N⟨⟩ | do | 20–30 | 18 |
| I | Cl | H₃C-⟨⟩-CH₃ | —N(CH₃)₃ | Acetone | 0–40 | 2 |
| K | Cl | H₃C-⟨⟩-CH₃ | N(CH₃)₃ | do | 0–40 | 2 |
| L | Cl | H₃C-⟨⟩-CH₃ | ⟨⟩—CH₂N(CH₃)₂ | do | 20–50 | 6 |
| M | Cl | Same as above | H₂₅C₁₂—N(CH₃)₂ | do | 20–30 | 16 |

EXAMPLES OF THE APPLICATION OF COMPOUNDS OF FORMULA I

Example 1

Printing pastes are prepared with 5 and 30 parts respectively of a compound of formula I:

10 parts of sodium hydrogen carbonate
5 parts of tertiary octylphenyl poly (4.5) glycolether
5 parts of sodium lauryl alcohol diglycol ether sulphate
400 parts of 8% sodium alginate solution and
x parts of water 1000 parts A knit fabric of "Helanca" nylon 66 is printed with the pastes in stripes of 3.5 cm. width with a distance of 2.5

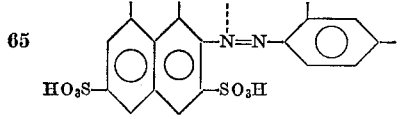

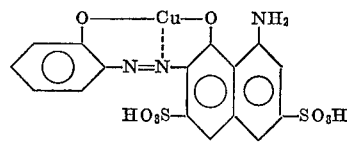

(c)

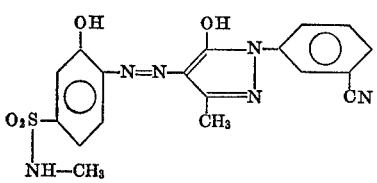

(2:2 dye: chromium complex)

The dyes are applied at 0.3% concentration for 60 minutes at 98° and liquor ratio 50:1, dyes (a), (b) and (c) with the addition of 2% acetic acid and dye (d) with 4% ammonium sulphate.

Dye (a) dyes the fabric red, dye (b) blue, dye (c) greenish blue and dye (d) yellowish red, the printed stripes showing a much heavier shade of the particular colour than the unprinted areas of the fabric. The difference in depth between the stripes printed with 5 and 30 parts of any one of the compounds A to M is very pronounced. The difference in depth between the stripes printed with the compounds of Examples A to M are in general slight. The compound of Example C leads only to a relatively minor increase in depth whereas those of Examples A and E have a relatively marked effect.

If 50 g. per litre of a neutral salt, such as sodium chloride or sodium sulphate is added to the printing paste, the effect obtained is further improved.

Example 2

Printing pastes are prepared according to the formulation in Example 1, with amounts of 5 and 30 parts per 1000 parts of the following ammonium salts:

2.1 the ammonium salt of formula IV described in Example A; the ammonium salts of the following formulae which do not come within the scope of formula I and are outside the scope of this invention:

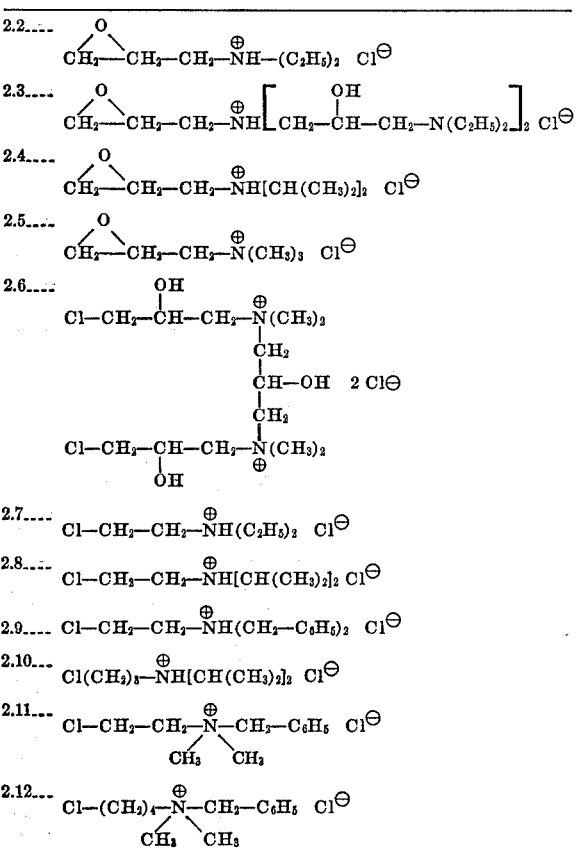

After fixation of the printed pastes the fabric is dyed with the four dyes specified in Example 1. The greater the depth of the stripes, the more effective is the particular compound of the series 2.1 to 2.12.

A comparison shows that compound 2.1, of formula IV, is considerably more effective than any of the compounds 2.2 to 2.12 that are outside the present invention. Of the latter, compound 2.8 is the most effective; accordingly it was applied again using other dyes for a more exact comparison with the compound of formula IV. The results showed that only with selected direct dyes is compound 2.8 about equal to the compound IV and that the latter is much more effective in dyeing with acid wool dyes.

Example 3

An aqueous solution is prepared containing per litre of water, 10 g. of tertiary octylphenyl poly (4–5) glycolether, 5 parts of sodium lauryl diglycol ether sulphate, 200 g. of 4% sodium alginate thickening and 20 g. of the compound described in Example F. The solution is padded on wool gaberdine at an expression enabling the fabric to retain 100% of its weight of the solution. The fabric is rolled up, wrapped in polyethylene sheet to prevent drying, and stored for 2 days at room temperature. After thorough rinsing, a piece of the treated fabric and an equal-sized piece of untreated wool gaberdine are dyed with 0.8% of the dye (b) shown in Example 1, from a bath set with 2% acetic acid. The treated wool gaberdine is dyed more rapidly and to a much deeper shade of blue than the untreated piece.

As an alternative to storage for 2 days, the padded fabric can be steamed for 5–10 minutes, on which comparable results are obtained in subsequent dyeing.

Example 4

A printing paste is made up with:

20 parts of the compound described in Example A or E
10 parts of sodium hydrogen carbonate
5 parts of tertiary octylphenylpoly (4–5)glycolether
300 parts of 4% sodium alginate solution and
x parts of water
—
1000 parts After thorough stirring for homogenization, the paste is printed on a woven or knitted fabric of nylon 6 or nylon 66 fibre by a screen printing process. One half of each fabric is fixed by storage for 2 days at room temperature and is subsequently rinsed with water. The other half is fixed by steaming for 5 minutes in saturated steam at 101–103° and then rinsed with water.

Pieces of the printed fabrics are exhaust dyed with the following dyes:

| | |
|---|---|
| C.I. Acid Yellow 19 | C.I. Acid Red 151 |
| C.I. Acid Yellow 25 | C.I. Acid Blue 23 |
| C.I. Acid Yellow 127 | C.I. Acid Blue 25 |
| C.I. Acid Orange 3 | C.I. Acid Blue 40 |
| C.I. Acid Orange 19 | C.I. Acid Blue 52 |
| C.I. Acid Orange 43 | C.I. Acid Blue 80 |
| C.I. Acid Red 5 | C.I. Acid Blue 92 |
| C.I. Acid Red 145 | C.I. Acid Blue 268 |

In all dyeings the printed areas are dyed to greater depth than the untreated. This is the case with pale medium and heavy shades and with combination dyeings. The screen printed pattern is clearly visible.

Comparable results are obtained when the printed fabric is dyed by a discontinuous or continuous padding process instead of an exhaust method.

The printed pattern remains unimpaired even after several hours' dyeing at the boil.

When the dyeings are submitted to the severe Iso test for water fastness (Swiss Standards Institution 195819), it can be seen that the printed areas have surprisingly good fastness in relation to the depth. In the dyeings of C.I. Acid Red 57 and Acid Blue 40, for example, the treated parts of the fabric, which are dyed to approximately twice the depth of the untreated, are about equal in water fastness to the untreated areas of lighter shade.

If this print pattern were produced by the normal screen printing process with the same dyes, the darker colours in the print would be considerably less fast than in the aforedescribed Example.

Example 5

A fabric of nylon 6 or 66 fibre is simultaneously printed with a paste of the composition given in Example 4 and a paste consisting of:

20 parts of 2,4-dichloro-6-phenylamino-1,3,5-triazine-4'-sulphonic acid (see French Patent 1,573,425 and British Patent 1,226,653).
  20 parts of disodium hydrogen phosphate
  5 parts of tertiary octylphenylpoly(4–5)glycolether
  300 parts of 4% sodium alginate solution and
  x parts of water 1000 parts The fabric is then exhaust dyed. Inspection of the dyeing reveals the following behaviour. The anionic dyes dye the areas treated with the compounds of Examples A and E to substantially greater depth and those treated with 2,4 - dichloro - 6-phenylamino-1,3,5-triazine-4'-sulphonic acid to considerably lower depth than the untreated areas. With cationic dyes the behaviour is the reverse of this. Disperse dyes do not respond to these treatments.

On textile substrates treated as above an indefinite number of the most varied shade and depth graduations can be produced a few of which may be mentioned by way of illustration:

(a) normal exhaust dyeing with 0.5% C.I. Acid Blue 92 to give dyeings of pale blue and medium blue shade with white effects;
(b) normal exhaust dyeing with 0.5% C.I. Acid Blue 92 and 0.2% C.I. Disperse Yellow 50 to give a fully dyed fabric with blue-green and yellow colour effects.
(c) normal exhaust dyeing with 0.5% C.I. Acid Blue 92 and 0.2% C.I. Basic Orange 37 for dyeings of dark blue, medium blue and golden yellow.

Example 6

Carpet yarn of textured nylon 6 or 66 is "space dyed," i.e. locally printed, with a paste of the following composition to give an increase of 100% over the dry weight on the printed areas:

First printing roller 400 parts of 4% sodium alginate solution
  20 parts of sodium bicarbonate
  15 parts of the compound described in Example A or E
  1 part of tertiary octylphenylpoly (4–5) glycolether and
  564 parts of water 1000 parts Second printing roller Paste composition as above, with the amount of the compound of Example A or E reduced to one fourth.

The second roller intersects the areas printed by the first. Paste homogeneity is maintained by vigorous stirring. After printing, the yarn is steamed for 4 minutes in saturated steam at 10–103° and then rinsed with water.

The yarn is tufted in jute backing fabric and pieces of this tufted carpet are exhaust dyed in various shades such as beige, grey, red, blue and olive with the dyes:

C.I. Acid Yellow 25
C.I. Acid Red 57
C.I. Acid Blue 72

The separate pieces of carpet all show the "space dyed" effect familiar to the colourist.

Example 7

The procedure is the same as that of Example 6 except that the paste applied by the second roller is replaced by one of the composition:

400 parts of 4% sodium alginate solution
  30 parts of 2,4 - dichloro - 6 - phenylamino - 1,3,5-triazine-4'-sulphonic acid
  20 parts of disodium phosphate
  5 parts of trisodium phosphate
  1 part of tertiary octylphenylpoly(4-5)glycolether and
  544 parts of water 1000 parts The fabric is steamed for 7 minutes in saturated steam at 10–103° and then rinsed with water. Subsequent exhaust dyeing results in colour effects showing that four degrees of dyeability have been imparted to the fabric relative to the untreated area:

| Areas of carpet printed with— | Dyeability in comparison with undyed areas | |
|---|---|---|
| | Anionic dyes | Cationic dyes |
| First printing roller | Greatly increased | Reduced |
| Second printing roller | Greatly reduced | Greatly increased |
| At the intersection points of the two rollers | Reduced | Increased |

If for instance, 0.5% C.I. Acid Blue 92 and 0.3% C.I. Basic Orange 37 are used, the fabric displays dark blue, medium blue, pale yellow and golden yellow areas. Thus, by appropriate selection of dyes a great number of diverse colour effects and graduations can be produced.

Example 8

Wool slubbing is Vigoureux printed at 25% coverage with a paste of the composition:

20 parts of the compound described in Example A or E
  5 parts of tertiary octylphenylpoly(4–5)glycolether
  250 parts of 4% sodium alginate solution and
  725 parts of water 1000 parts The past is homogenized by thorough stirring. The increase in weight on the printed area is 100%.

For fixation, the wool slubbing is steamed for 10 minutes in saturated steam at 102° and is then rinsed with water, dried and converted into worsted yarn.

If the yarn is exhaust dyed by the normal method, the individual fibres exhibit different depths. Dyeing with 1% of the dye of formula

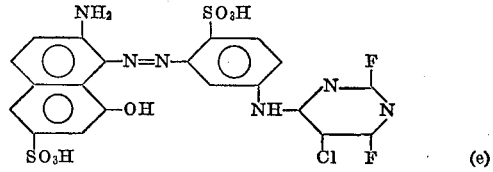

(e)

in the presence of sodium bicarbonate or 10 parts of sodium acetate are included in the printing paste, the depth differentiation is even more pronounced.

Example 9

50 Parts of nylon 6 or 66 or 11 or of wool or silk in the form of loose fibre or yarn are placed in a cold solution of 1 part of the compound described in Example A or E in 1000 parts of water. The solution is raised to the boil in 30 minutes and the fibre or yarn treated at the boil for 30 minutes. On removal it is rinsed with water, dried and spun with untreated fibre or yarn into yarn or twist yarn.

On dyeing with anionic dyes treated fibres in the yarn absorb a far greater proportion of the dye than the untreated. The difference is very marked when the pretreatment bath is set additionally with 1 part of sodium bicarbonate.

Example 10

A 1% solution of the compound described in Example A or B containing 1% sodium bicarbonate is irregularly sprayed on knitted garments of nylon 6 or 66 fibre. The garments are stored for one day at room temperature, then rinsed with water and exhaust dyed in a paddle dyeing machine with the dyes:

C.I. Acid Blue 92
C.I. Acid Red 145
C.I. Direct Green 28

The treated areas absorb considerably more dye than the untreated.

Example 11

A paste consisting of 300 parts of 3% sodium alginate solution
10 parts of the compound described in Example E
1 part of tertiary octylphenylpoly(4–5)glycolether and
689 parts of water
―――
1000 parts is screen printed on a lustrous nylon 66 fabric with a weight increase of 100% on the pattern area. Paste homogeneity is maintained by vigorous stirring. After intermediate drying the print is fixed for 60 seconds in dry heat at 60° and rinsed.

Separate pieces of the fabric are dyed with different combinations of anionic dyes. The printed pattern is clear and distinct since substantially more dye is absorbed by the treated nylon 66 fiber.

Example 12

50 parts of a knitted fabric of "Helanca" nylon 66 are placed in a solution of 1 part of the compound described in Example F and 1 part of sodium bicarbonate in 1000 parts of water at 40°. After the solution has been brought to the boil the fabric is treated for 30 minutes at this temperature, with subsequent rinsing. It is dyed from an acetic acid bath with a dye of the copper phthalocyanine trisulphonic acid type. Fabric thus treated absorbs considerably more dye than untreated fabric.

Example 13

A paste of the composition 20 parts of the compound described in Example A or E
20 parts of sodium bicarbonate
200 parts of 4% sodium alginate solution and
760 parts of water
―――
1000 parts is roller printed on a cotton fabric with a weight increase of 100% on the pattern area, paste homogeneity being maintained by thorough stirring. The paste is fixed by treatment for 5 minutes in dry heat at 150°. After intermediate rinsing the fabric is dyed with C.I. Acid Red 57 in a bath weakly acidified by acetic acid. On the area of the printed pattern a substantial quantity of dye is absorbed while the remainder of the fabric is almost completely reserved.

Comparable results are obtained when this procedure is employed with mercerized or causticized cotton or spun rayon fabric.

If C.I. Acid Red 57 is replaced by C.I. Direct Green 28, the latent pattern is dyed to appreciably greater depth than the remaining area of the fabric.

What is claimed is:

1. A process for increasing the affinity for anion dyes of an undyed water-insoluble high molecular weight organic compound containing groups which can be alkylated and selected from the group consisting of polyamide, casein, cellulose, basic modified polypropylene, and basic modified polyacrylonitrile, which process comprises reacting the high molecular weight compound with an ammonium salt of the formula

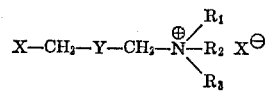

in which
X is chlorine or bromine,
Y is a radical of formula —CH=CH— or a phenylene radical which is substituted or unsubstituted by up to a total of 2 alkyl groups which may be methyl or ethyl,
$R_1$, $R_2$ and $R_3$ independently are hydrocarbon radicals consisting of aromatic and/or saturated aliphatic units, or
two of $R_1$, $R_2$ and $R_3$ jointly with the N atom form a heterocyclic ring, which is selected from heterocyclic rings containing one nitrogen atom, two nitrogen atoms and one nitrogen atom and one oxygen atom, and the other is a hydrocarbon radical as defined above or a further bond when the ring is unsaturated, the maximum number of carbon atoms in $R_1$, $R_2$ and $R_3$ being 20, and the N atom being bound directly to a maximum of one aromatic radical.

2. A process according to Claim 1, in which in the ammonium salt, the total number of carbon atoms in $R_1$, $R_2$ and $R_3$ is from 5 to 20.

3. A process according to Claim 2, in which the total number of carbon atoms is from 6 to 12.

4. A process according to Claim 1, in which the high molecular weight compound is selected from the group consisting of nylon, a basic modified polypropylene, a basic modified polyacrylonitrile, regenerated cellulose, casein, cotton, silk and wool.

5. A process according to Claim 4, in which the high molecular weight compound is nylon 66.

6. A process according to Claim 1 which includes the step of dyeing the reacted high molecular weight compound with an anionic dye.

7. A process according to Claim 6 wherein the anionic dye is an acid dye, a direct dye, a water soluble vat dye or a 2:1 chromium or cobalt complex dye.

8. A process according to Claim 1 wherein each of $R_1$, $R_2$, and $R_3$, when a hydrocarbon radical, is independently alkyl, cycloalkyl, alkylcycloalkyl, cycloalkylalkyl, aryl, alkaryl or aralkyl.

9. A process according to Claim 8 wherein any aromatic portion of $R_1$, $R_2$, or $R_3$ is pheny or naphthyl.

10. A process according to Claim 9 wherein any heterocyclic ring formed by $R_1$, $R_2$ or $R_3$ is pyrrolidine, piperidine, morpholine, pyridine, or quinoline.

11. A process according to Claim 1 wherein the reaction is carried out at a temperature between room temperature and 220° C.

12. A process according to Claim 1 which is carried out in the presence of a solvent for the ammonium salt.

13. A process according to Claim 1 wherein the high molecular weight material is in the form of a filament, fibre, yarn, woven fabric or knit fabric.

14. A high molecular weight organic compound selected from the group consisting of polyamide, cellulose, casein, basic modified polypropylene and basic modified polyacrylonitrile and having attached thereto by a covalent linkage a radical of the formula

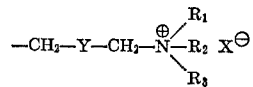

wherein
X is chlorine or bromine,
Y is a radical of formula —CH=CH— or a phenylene radical which is substituted or unsubstituted by up to a total of 2 alkyl groups which may be methyl or ethyl, $R_1$, $R_2$ and $R_3$, independently are hydrocarbon radicals consisting of aromatic and/or saturated aliphatic units, or two of $R_1$, $R_2$ and $R_3$ jointly with the N atom form a heterocyclic ring, which is selected from heterocyclic rings containing one nitrogen atom, two nitrogen atoms and one nitrogen atom and one oxygen atom, and the other is a hydrocarbon radical as defined above or a further bond when the ring is saturated, the maximum number of carbon atoms in $R_1$, $R_2$ and $R_3$ being 20, and the N atom being bound directly to a maximum of one aromatic radical.

15. A compound according to Claim 14 which is in the form of a filament, fibre, yarn, woven fabric or knit fabric.

16. A compound according to Claim 14 which is nylon 66.

References Cited

UNITED STATES PATENTS

| 3,126,246 | 3/1964 | Cappuccio et al. | 8—115.5 |
| 3,685,953 | 8/1972 | Cuvelier et al. | 8—115.5 |

THOMAS J. HERBERT, Jr., Primary Examiner

U.S. Cl. X.R.

260—567.6